(12) United States Patent
Gonzalez et al.

(10) Patent No.: US 12,287,005 B2
(45) Date of Patent: Apr. 29, 2025

(54) ATTACHMENT OF PDC BEARING MEMBERS, BEARING ASSEMBLIES INCORPORATING SAME AND RELATED METHODS

(71) Applicant: US Synthetic Corporation, Orem, UT (US)

(72) Inventors: Jair J. Gonzalez, Provo, UT (US); Leonidas C. Leite, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 101 days.

(21) Appl. No.: 17/926,256

(22) PCT Filed: May 10, 2021

(86) PCT No.: PCT/US2021/031561
§ 371 (c)(1),
(2) Date: Nov. 18, 2022

(87) PCT Pub. No.: WO2021/236368
PCT Pub. Date: Nov. 25, 2021

(65) Prior Publication Data
US 2023/0265884 A1    Aug. 24, 2023

Related U.S. Application Data

(60) Provisional application No. 63/028,375, filed on May 21, 2020.

(51) Int. Cl.
| | |
|---|---|
| *F16C 33/26* | (2006.01) |
| *F16C 17/04* | (2006.01) |
| *F16C 33/04* | (2006.01) |

(52) U.S. Cl.
CPC .............. *F16C 33/26* (2013.01); *F16C 17/04* (2013.01); *F16C 33/043* (2013.01);
(Continued)

(58) Field of Classification Search
CPC ........ F16C 17/04; F16C 33/043; F16C 33/26; F16C 2226/10; F16C 2226/34;
(Continued)

(56) References Cited

U.S. PATENT DOCUMENTS

| | | | | |
|---|---|---|---|---|
| 4,620,601 | A * | 11/1986 | Nagel | E21B 4/003 384/282 |
| 7,901,137 | B1 * | 3/2011 | Peterson | F16C 33/108 175/403 |

(Continued)

FOREIGN PATENT DOCUMENTS

WO    2013124388 A3    10/2013

OTHER PUBLICATIONS

PCT International Patent Application No. PCT/US2021/031561, International Search Report and Written Opinion Mailed Aug. 6, 2021, 14 pp.

*Primary Examiner* — Alan B Waits
(74) *Attorney, Agent, or Firm* — BKRIP LLC

(57) ABSTRACT

Bearing assemblies and methods of manufacturing bearing assemblies are provided in the present disclosure. In one embodiment, a bearing assembly includes a base member and at least one bearing element coupled to the base member. The bearing element may be coupled with the base member by at least two different coupling techniques, including two of: a mechanical fastener, a clamped structure, a geometrical fit, welding, and brazing. In one embodiment, a first technique may include use of a mechanical fastener and a second technique may include welding or brazing. In another embodiment, a first technique may include use of a clamping mechanism or structure and a second technique may include welding or brazing. In another embodiment, a first technique may include use of a geometrical fit and a second technique may include welding or brazing.

17 Claims, 10 Drawing Sheets

(52) U.S. Cl.
CPC ...... *F16C 2226/10* (2013.01); *F16C 2226/34* (2013.01); *F16C 2226/36* (2013.01); *F16C 2226/50* (2013.01)

(58) Field of Classification Search
CPC .............. F16C 2226/36; F16C 2226/50; F16C 2352/00; E21B 4/003
See application file for complete search history.

(56) References Cited

U.S. PATENT DOCUMENTS

| | | | |
|---|---|---|---|
| 8,646,981 B2 | 2/2014 | Peterson | |
| 2011/0174544 A1* | 7/2011 | Scott | F16C 33/26 |
| | | | 384/95 |
| 2011/0174547 A1 | 7/2011 | Sexton | |
| 2012/0281938 A1 | 11/2012 | Peterson | |
| 2013/0037328 A1 | 2/2013 | Sexton | |
| 2013/0186691 A1* | 7/2013 | Scott | F16C 43/02 |
| | | | 384/129 |
| 2014/0345141 A1* | 11/2014 | Gonzalez | F16C 33/127 |
| | | | 29/898.04 |
| 2015/0204380 A1* | 7/2015 | Gonzalez | F16C 17/243 |
| | | | 384/278 |
| 2015/0233423 A1* | 8/2015 | Peterson | F16C 43/02 |
| | | | 384/420 |
| 2015/0300403 A1* | 10/2015 | Gonzalez | F16C 17/02 |
| | | | 29/898.04 |
| 2021/0222734 A1* | 7/2021 | Gonzalez | F16C 43/02 |

* cited by examiner

FIG. 6A    FIG. 6B

ATTACHMENT OF PDC BEARING MEMBERS, BEARING ASSEMBLIES INCORPORATING SAME AND RELATED METHODS

CROSS-REFERENCE TO RELATED APPLICATIONS

This application is a national phase entry under 35 U.S.C. § 371 of International Patent Application PCT/US2021/031561, filed May 10 2021, designating the United States of America and published in English as International Patent Publication WO WO2021236368 on Nov. 25, 2021 for "ATTACHMENT OF PDC BEARING MEMBERS, BEARING ASSEMBLIES INCORPORATING SAME AND RELATED METHODS," which application claims priority to U.S. Provisional Application No. 63/028,375 filed on 21 May 2020, the disclosure of each of which is incorporated herein, in its entirety, by this reference.

BACKGROUND

Conventional bearing apparatuses including bearing surfaces that move relative to one another are known in the art. For example, as known in the art, mechanical systems conventionally used in downhole drilling may include radial bearings and/or thrust bearings. In one example, two separate bearing rings may each be provided with a plurality of superhard bearing elements (e.g., polycrystalline diamond elements). The rings may be positioned adjacent one another so that the bearing surfaces of the bearing elements of one ring contact the bearing surfaces of the bearing elements of the other ring. In other embodiments, a bearing ring having a plurality of bearing elements may be combined with another component that acts as a stator or rotor and is placed in contact with the bearing surface defined by the bearing elements.

Bearing elements are conventionally coupled with a bearing ring by way of brazing. However, bearings are often subject to harsh environments and application of substantial forces and/or impacts. Thus, the brazing of a bearing element to a bearing ring or other structure adds complexity to the manufacture/repair of bearings or can cause premature failure, requiring the replacement or repair of the bearing. This can be both time consuming and costly. Thus, it would be advantageous to provide improved bearing assemblies and bearing apparatuses that include attachment mechanisms and techniques that may extend the in-service life of the bearing elements and the bearing assemblies, reducing costs and maintenance requirements on various types of equipment.

SUMMARY

The present disclosure is related to bearing assemblies and methods of manufacturing or fabricating bearing assemblies. In accordance with various embodiments, bearing assemblies are provided with multiple modes of coupling between a bearing element and a base member or other bearing structure.

In accordance with one embodiment, a bearing assembly is provided that comprises a base member and at least one bearing element coupled to the base member by at least two of: a mechanical fastener, a clamped structure, a geometrical fit, welding, or brazing.

In one embodiment, the at least one bearing element includes a superhard table bonded to a substrate. and a carrier element attached to the substrate.

In one embodiment, the at least two includes a mechanical fastener and either welding or brazing.

In one embodiment, the base member includes an opening formed therein. The at least one bearing element includes a carrier element attached to the substrate, the carrier element including a threaded opening formed therein. Additionally, the mechanical fastener extends through the opening in the base member and is threadedly coupled with the carrier member.

In one embodiment, the at least one bearing member is disposed in a pocket formed in the base member.

In one embodiment, the at least two includes a clamped structure and either welding or brazing.

In one embodiment, the bearing assembly further comprises a retainer having at least one opening formed therein. The at least one bearing element includes a carrier element attached to the substrate, the carrier element being sized and configured to provide an abutment shoulder. At least a portion of the table extends through the opening of the retainer and at least one mechanical fastener couples the retainer with the base member such that the at least one bearing element is captured between the base member and the retainer with the abutment shoulder of the carrier element abutting a surface of the retainer.

In one embodiment, the base member includes a wall, and the at least one bearing element includes a key that engages the wall to inhibit rotation of the at least one bearing element relative to the base member.

In one embodiment, the wall is substantially cylindrical and the key is formed as a recess in the carrier element and provides an arcuate surface to engage the wall.

In one embodiment, the at least two includes a geometrical fit and either welding or brazing.

In one embodiment, the at least one bearing element exhibits a thickness that varies along a first axis and a width that varies along a second axis, the second axis being orthogonal to the first axis.

In one embodiment, the base member is substantially cylindrical, having a rotational axis, and includes at least one pocket that substantially conformally mates with the geometry of the at least one bearing element. The thickness of the at least one bearing element decreases as it extends radially from the rotational axis and the width of the at least one bearing element decreases as it extends in a direction parallel to the rotational axis to a bearing surface of the at least one bearing element.

In accordance with one embodiment of the present disclosure, a method of fabricating a bearing assembly is provided. The method comprises: providing a bearing structure; providing a bearing element; coupling the bearing element to the bearing structure using a first coupling technique; coupling the bearing element to the bearing structure using a second coupling technique, the second coupling technique being different than the first coupling technique.

In one embodiment, providing a bearing element includes providing a bearing element having a superhard table bonded to a substrate.

In one embodiment, the first coupling technique includes coupling the at least one bearing element to the bearing structure with a mechanical fastener and the second technique includes either welding or brazing.

In one embodiment, the first coupling technique further includes extending the mechanical fastener through an opening formed in the bearing structure and threadedly coupling the mechanical fastener with a carrier element attached to the substrate.

In one embodiment, the first coupling technique includes coupling the at least one bearing element to the bearing structure with a clamping structure and the second technique includes either welding or brazing.

In one embodiment, the first coupling technique further includes capturing the at least one bearing element between the bearing structure and a retainer.

In one embodiment, the method further comprises coupling the retainer to the bearing structure with a mechanical fastener.

In one embodiment, the first coupling technique includes creating a geometrical fit between the at least one bearing element and the bearing structure and the second technique includes either welding or brazing.

In one embodiment, the first coupling technique further includes: configuring the at least one bearing element to exhibit a thickness that varies along a first axis and a width that varies along a second axis, the second axis being orthogonal to the first axis; configuring the bearing structure with at least one pocket exhibiting a geometry that substantially conformally mates with the at least one bearing element; and disposing the at least one bearing element in the at least one pocket.

In one embodiment, the method further comprises: configuring the bearing structure to exhibit a substantially cylindrical geometry with a rotational axis; configuring the thickness of the at least one bearing element to decrease as it extends radially from the rotational axis; and configuring the width of the at least one bearing element decreases as it extends in a direction parallel to the rotational axis to a bearing surface of the at least one bearing element.

In accordance with another embodiment of the present disclosure, a bearing assembly is provided that includes a base member and at least one bearing element comprising a superhard table bonded to a substrate, the at least one bearing element being coupled to the base member using a first coupling means and a second coupling means, the first coupling means being different than the second coupling means.

In accordance with another embodiment of the present disclosure, a bearing assembly includes a substantially cylindrical base member having a rotational axis and at least one pocket. At least one bearing member is disposed within the pocket, the at least one bearing member exhibiting a thickness that decreases as it extends radially from the rotational axis; and a width that decreases as it extends in a direction parallel to the rotational axis to a bearing surface of the at least one bearing element. A protrusion is formed in the at least one pocket and in contact with a surface of the at least one bearing member, enabling the at least one bearing element to pivot about the protrusion within the pocket.

In accordance with another embodiment, a bearing assembly is provided that includes a base member and at least one bearing element. The at least one bearing element is disposed in a pocket formed in the base member by way of an interference fit. The at least one bearing member is additionally coupled with the base member by way of a mechanical attachment. In some embodiments, a thermally conductive structure or a thermally conductive material (such as paste or grease) may be disposed between the at least one bearing element and the base member to provide an enhanced thermal pathway between the at least one bearing element and the base member.

In accordance with a further embodiment, a method of forming a bearing assembly is provided. The method includes providing a bearing structure and a bearing element. The method further includes coupling the bearing element with the bearing structure by way of a press fit or interference fit. The method additionally includes coupling the bearing element to the bearing structure using a mechanical fastener. In some embodiments, the method my further include providing an enhanced thermal coupling between the bearing element and the bearing structure.

Features from any of the disclosed embodiments may be used in combination with one another, without limitation. In addition, other features and advantages of the instant disclosure will become apparent to those of ordinary skill in the art through consideration of the ensuing description, the accompanying drawings, and the appended claims.

BRIEF DESCRIPTION OF THE DRAWINGS

Further features of the subject matter of the instant disclosure, its nature, and various advantages will be more apparent from the following detailed description and the accompanying drawings, which illustrate various exemplary embodiments, are representations, and are not necessarily drawn to scale, wherein.

DETAILED DESCRIPTION

The present disclosure relates generally to bearing assemblies that enable bearing elements to be securely fastened to a carrying structure, such as a bearing ring. The bearing assemblies may include bearing surfaces comprising superhard materials. "Superhard," as used herein, refers to any material having a hardness that is at least equal to or exceeds a hardness of tungsten carbide (e.g., polycrystalline diamond, boron nitride, silicon carbide, mixtures of the foregoing, or any suitable material). In one embodiment, a bearing apparatus may include polycrystalline diamond inserts or compacts defining a plurality of surfaces that move relative to one another (or relative to some other surface or mechanical component). Bearing assemblies of the present disclosure may enable extended use of bearing elements and, therefore, extended life of the bearing assemblies, through simple and efficient maintenance of the assemblies.

Figure 1:
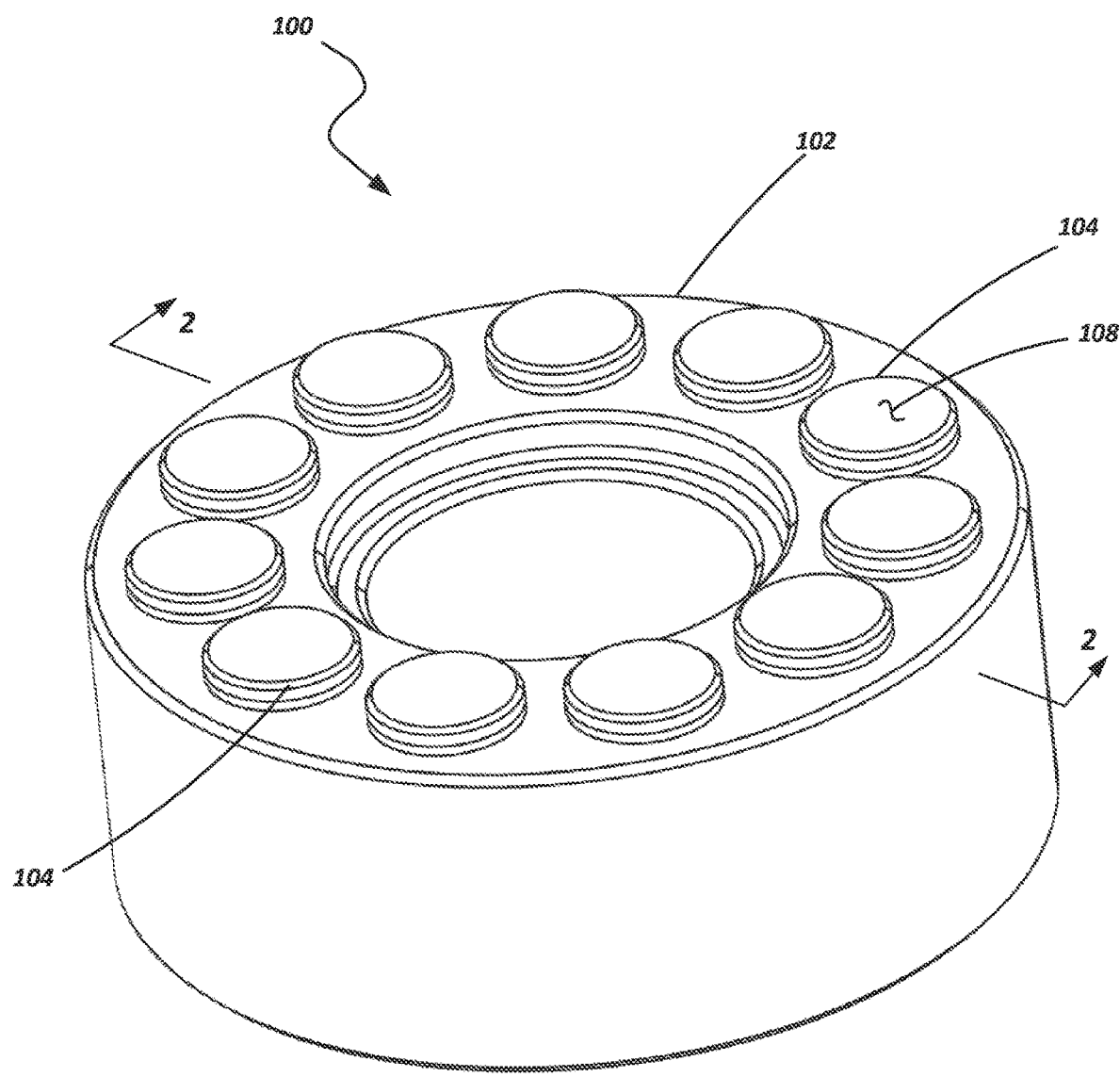
FIG. 1 shows a perspective view of a bearing assembly according to an embodiment of the present disclosure.
Figure 2:
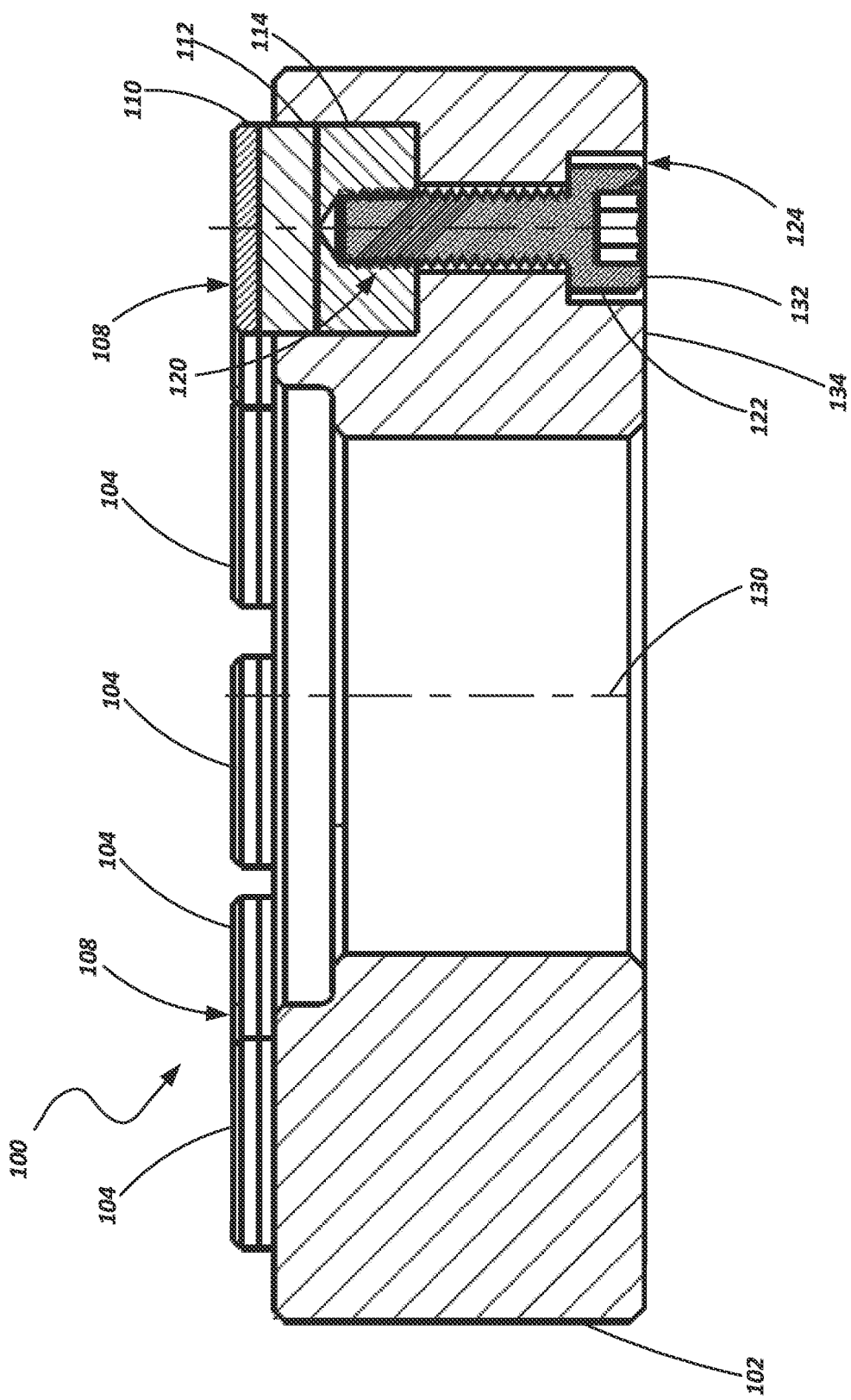
FIG. 2 shows a cross-sectional side view of the bearing assembly shown in FIG. 1.
Figure 3:
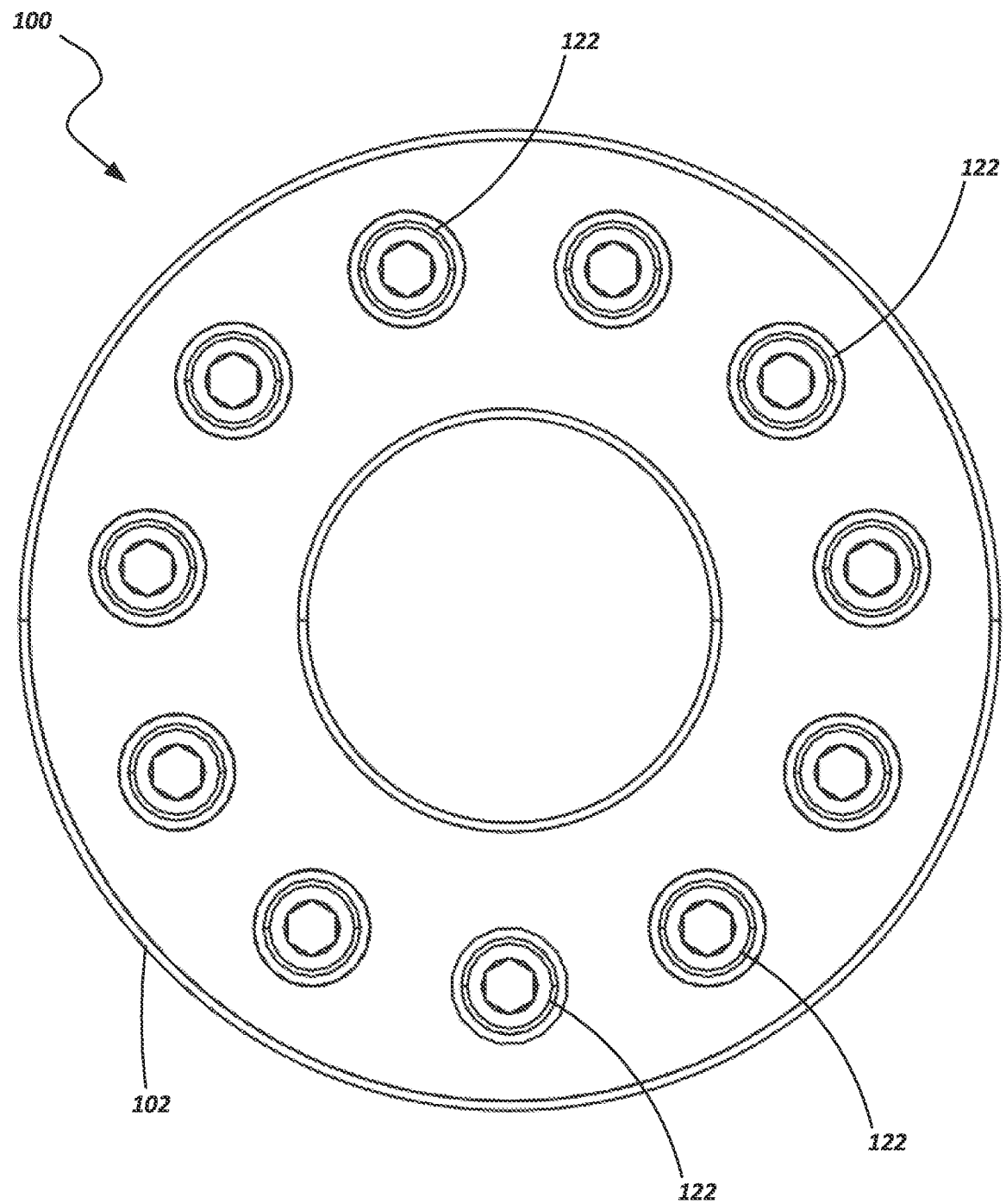
FIG. 3 shows a bottom view of the bearing assembly shown in FIG. 1.

Referring to FIGS. 1-3, in accordance with one embodiment of the present disclosure, a bearing assembly 100 (configured for use in a thrust bearing apparatus) may include a body, or a bearing ring 102, having one or more bearing elements 104 mounted in the bearing ring 102. For example, in one embodiment, each of the bearing elements 104 may be disposed within an associated pocket formed in the bearing ring 102. Whether or not disposed within a pocket, each of the bearing elements 104 may be coupled with the bearing ring 102 using one or more attachment mechanism, feature, and/or method as will be described in further detail below.

In one embodiment the bearing ring 102 may be formed of a metal material (e.g., steel, stainless steel, Super Duplex stainless steel, titanium, Inconel®, Stellite™ or any suitable metal alloy), a carbide material, or other hard materials.

In some embodiments, the bearing elements 104 may be formed of superhard materials. For example, the bearing elements 104 may include polycrystalline cubic boron nitride, polycrystalline diamond or other superhard materials. In some embodiments, the bearing elements 104 may include a superhard table defining a bearing surface 108 of the bearing element 104. In some embodiments, the bearing element 104 may comprise a polycrystalline diamond compact ("PDC") including a polycrystalline diamond ("PCD") table to which a substrate is bonded. In some embodiments, the interface between the table and the substrate may be substantially flat or planar. In other embodiments, the interface may be domed or curved. In other embodiments, the interface between the table and the substrate may include a plurality of raised features and/or recessed features (e.g., dimples, grooves, ridges, etc.) or any suitable nonplanar interface, without limitation. In some embodiments, the substrate may comprise a cobalt-cemented tungsten carbide substrate bonded to the table. When a polycrystalline diamond table is bonded to a substrate, the bearing element 104 may be referred to polycrystalline diamond compact, or PDC.

In certain embodiments, the table may exhibit a maximum thickness (e.g., from the bearing surface to the interface between the table and the substrate) that is approximately 0.1 inch or greater. In other embodiments, the table may exhibit a maximum thickness of as great as 0.5 inch or greater. Examples of bearing elements having various thicknesses and various configurations are described in U.S. Pat. No. 9,080,385, issued Jul. 14, 2015 to Gonzalez et al., the disclosure of which is hereby incorporated by reference herein in its entirety.

The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of the PCD table may include a metal-solvent catalyst or a metallic infiltrant disposed therein that is infiltrated from the substrate or from another source during fabrication. For example, the metal-solvent catalyst or metallic infiltrant may be selected from iron, nickel, cobalt, and alloys of the foregoing. In some embodiments, the PCD table may further include thermally-stable diamond in which the metal-solvent catalyst or metallic infiltrant has been partially or substantially completely depleted from a selected surface or volume of the PCD table (e.g., to a selected depth from the bearing surface), such as via an acid leaching process. In some embodiments, the catalyst-depleted region may exhibit a depth that is substantially conformal with an outer surface of the PCD table. In other embodiments, the catalyst-depleted region may generally extend a desired depth from a plane extending through the uppermost portions of the table. In yet another embodiment, thermally-stable PCD may be sintered with one or more alkali metal catalysts.

In some embodiments, PDCs which may be used as the bearing elements 106 may be formed in an HPHT process. For example, diamond particles may be disposed adjacent to the substrate and subjected to an HPHT process to sinter the diamond particles to form the PCD table and bond the PCD table to the substrate, thereby forming the PDC. The temperature of the HPHT process may be at least about 1000° C. (e.g., about 1200° C. to about 1600° C.) and the cell pressure, or the pressure in the pressure-transmitting medium (e.g., a refractory metal can, graphite structure, pyrophyllite, etc.), of the HPHT process may be at least 4.0 GPa (e.g., about 5.0 GPa to about 12 GPa or about 7.5 GPa to about 11 GPa) for a time sufficient to sinter the diamond particles.

In some embodiments, the diamond particles may exhibit an average particle size of about 50 μm or less, such as about 30 μm or less, about 20 μm or less, about 10 μm to about 20 μm, about 10 μm to about 18 μm, about 12 μm to about 18 μm, or about 15 μm to about 18 μm. In some embodiments, the average particle size of the diamond particles may be about 10 μm or less, such as about 2 μm to about 5 μm or submicron. In some embodiments, the diamond particles may exhibit multiple sizes and may comprise, for example, a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.9 μm, 0.8 μm, 0.7 μm, 0.6 μm, 0.5 μm, less than 0.5 μm, 0.4 μm, 0.3 μm, 0.2 μm, 0.1 μm, less than 0.1 μm). For example, in one embodiment, the diamond particles may include a portion exhibiting a relatively larger size between about 10 μm and about 40 μm and another portion exhibiting a relatively smaller size between about 0.5 μm and 4 μm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions. More details about diamond particle sizes and diamond particle size distributions that may be employed are disclosed in U.S. Pat. No. 9,346,149, the disclosure of which is incorporated by reference herein in its entirety.

In some embodiments, the diamond grains of the resulting table may exhibit an average grain size that is equal to or less than approximately 12 μm and include cobalt content of greater than about 7 weight percent (wt. %) cobalt. In some other embodiments, the diamond grains of the resulting table may exhibit an average grain size that is equal to or greater than approximately 20 μm and include cobalt content of less than approximately 7 wt. %. In some embodiments, the diamond grains of the resulting table may exhibit an average grains size that is approximately 10 μm to approximately 20 μm.

In some embodiments, tables may comprise PCD sintered at a pressure of at least about 7.5 GPa, may exhibit a coercivity of 115 Oe or more, a high-degree of diamond-to-diamond bonding, a specific magnetic saturation of about 15 G·cm$^3$/g or less, and a metal-solvent catalyst content of about 7.5 wt. % or less. The PCD may include a plurality of diamond grains directly bonded together via diamond-to-diamond bonding to define a plurality of interstitial regions. At least a portion of the interstitial regions or, in some embodiments, substantially all of the interstitial regions may be occupied by a metal-solvent catalyst, such as iron, nickel, cobalt, or alloys of any of the foregoing metals. For example, the metal-solvent catalyst may be a cobalt-based material including at least 50 wt. % cobalt, such as a cobalt alloy.

The metal-solvent catalyst that occupies the interstitial regions may be present in the PCD in an amount of about 7.5 wt. % or less. In some embodiments, the metal-solvent catalyst may be present in the PCD in an amount of about 3 wt. % to about 7.5 wt. %, such as about 3 wt. % to about 6 wt. %. In other embodiments, the metal-solvent catalyst content may be present in the PCD in an amount less than about 3 wt. %, such as about 1 wt. % to about 3 wt. % or a residual amount to about 1 wt. %. By maintaining the metal-solvent catalyst content below about 7.5 wt. %, the PCD may exhibit a desirable level of thermal stability.

Generally, as the sintering pressure that is used to form the PCD increases, the coercivity may increase and the magnetic saturation may decrease. The PCD defined collectively by the bonded diamond grains and the metal-solvent catalyst may exhibit a coercivity of about 115 Oe or more, a metal-solvent catalyst content of less than about 7.5 wt. %, and/or a specific magnetic saturation of about 15 G·cm$^3$/g or less. In a more detailed embodiment, the coercivity of the PCD may be about 115 Oe to about 250 Oe and the specific magnetic saturation of the PCD may be greater than 0 G·cm$^3$/g to about 15 G·cm$^3$/g. In an even more detailed embodiment, the coercivity of the PCD may be about 115 Oe to about 175 Oe and the specific magnetic saturation of the PCD may be about 5 G·cm$^3$/g to about 15 G·cm$^3$/g. In yet an even more detailed embodiment, the coercivity of the PCD may be about 155 Oe to about 175 Oe and the specific magnetic saturation of the PCD may be about 10 G·cm$^3$/g to about 15 G·cm$^3$/g. The specific permeability (i.e., the ratio of specific magnetic saturation to coercivity) of the PCD of any embodiment disclosed herein may be about 0.10 or less, such as about 0.060 to about 0.090. Despite the average grain size of the bonded diamond grains being less than about 30 μm, the metal-solvent catalyst content in the PCD may be less than about 7.5 wt. %, which may result in a desirable thermal stability.

In one embodiment, diamond particles having an average particle size of about 18 μm to about 20 μm are positioned adjacent to a cobalt-cemented tungsten carbide substrate and subjected to an HPHT process at a temperature of about 1390° C. to about 1430° C. and a cell pressure of about 7.8 GPa to about 8.5 GPa. The PCD so-formed as a PCD table bonded to the substrate may exhibit a coercivity of about 155 Oe to about 175 Oe, a specific magnetic saturation of about 10 G·cm$^3$/g to about 15 G·cm$^3$/g, and a cobalt content of about 5 wt. % to about 7.5 wt. %.

In one or more embodiments, a specific magnetic saturation constant for the metal-solvent catalyst in the PCD may be about 185 G·cm$^3$/g to about 215 G·cm$^3$/g. For example, the specific magnetic saturation constant for the metal-solvent catalyst in the PCD may be about 195 G·cm$^3$/g to about 205 G·cm$^3$/g. It is noted that the specific magnetic saturation constant for the metal-solvent catalyst in the PCD may be composition dependent.

Generally, as the sintering pressure is increased above 7.5 GPa, a wear resistance of the PCD so-formed may increase. For example, the $G_{ratio}$ may be at least about 4.0×10$^6$, such as about 5.0×10$^6$ to about 15.0×10$^6$ or, more particularly, about 8.0×10$^6$ to about 15.0×10$^6$. In some embodiments, the $G_{ratio}$ may be at least about 30.0×10$^6$. The $G_{ratio}$ is the ratio of the volume of workpiece cut (e.g., between about 470 in$^3$ of barre granite to about 940 in$^3$ of barre granite) to the volume of PCD worn away during a cutting process.

The material characteristics discussed herein, as well as other characteristics that may be provided in a bearing element, including processes for measuring and determining such characteristics, as well as methods of making such bearing elements, are described in U.S. Pat. Nos. 7,866,418, 8,297,382, and 9,315,881, the disclosure of each of which is incorporated by reference herein in its entirety.

In some embodiments, the table may comprise high density polycrystalline diamond. For example, in some embodiments, the table may comprise approximately 95 percent diamond by volume (vol. %) or greater. In some embodiments, the table 170 may comprise approximately 98 vol. % diamond or greater. In some embodiments, the table 170 may comprise approximately 99 vol. % diamond or greater. In other embodiments, the table may comprise polycrystalline diamond or relatively low diamond content. For example, in some embodiments, the table may comprise less than 95 percent diamond by volume (vol. %).

In some embodiments, the table may be integrally formed with the substrate such as discussed above. In some other embodiments, the table may be a pre-formed table that has been HPHT bonded to the substrate in a brazing process or in a second HPHT process after being initially formed in a first HPHT process. For example, the table may be a pre-formed PCD table that has been leached to substantially completely remove the metal-solvent catalyst used in the manufacture thereof and subsequently HPHT bonded or brazed to the substrate in a separate process.

The substrate may be formed from any number of different materials, and may be integrally formed with, or otherwise bonded or connected to, the table. Materials comprising the substrate may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof.

As discussed above, in some embodiments, the table may be leached to deplete a metal-solvent catalyst or a metallic infiltrant therefrom in order to enhance the thermal stability of the table. For example, when the table is a PCD table, the table may be leached to remove at least a portion of the metal-solvent catalyst, that was used to initially sinter the diamond grains to form a leached thermally-stable region from a working region thereof (e.g., the bearing surface) to a selected depth. The leached thermally-stable region may extend inwardly from the working surface to a selected depth. In some embodiments, the entire table may be leached such that it is substantially completely devoid of metal-solvent catalyst material. The leaching may be performed in a suitable acid, such as aqua regia, nitric acid, hydrofluoric acid, or mixtures of the foregoing.

Referring still to FIGS. 1-3, the bearing elements 104 may be joined or attached to the bearing ring 102 by way of a variety of means, mechanisms, methods or techniques. For example, referring to FIGS. 2 and 3, each bearing element 104 may include a table 110 coupled with a substrate 112 such as has been discussed above. The substrate 112 may further be coupled with a carrier member 114. The carrier member 114 may be formed from any of a number of suitable materials. For example, the carrier may comprise a metal (e.g., steel, stainless steel, Super Duplex stainless steel, titanium, Inconel®, Stellite™ or any suitable metal alloy), a carbide material, or other hard materials. In some embodiments, the carrier member 114 may be joined with the substrate 112 by way of brazing. In one embodiment, a brazing material having a melting point of less than 700° C. may be used. Low temperature brazing may be accomplished using, for example, Silvaloy® 505 available from Lucas-Milhaupt, Inc. This brazing composition has a melting point of approximately 660° C. and a flow point of approximately 705° C. In other embodiments, the carrier member 114 may be joined with the substrate using a localized, low temperature welding technique such as by TIG (tungsten inert gas) welding or by laser welding.

In other embodiments, the bearing element 104 is not materially joined to the bearing ring 102 (e.g., it is not brazed and/or is not welded to the bearing ring 102), but instead is press fit (e.g., using a geometrical interference fit) into the pocket. Such a press fit or interference fit may be accomplished, for example, by providing a bearing element 104 that is slightly oversized compared to the pocket in which it will be disposed, cooling the bearing element 104 (to induce thermal contraction) and/or heating the bearing ring 102 (to induce thermal expansion), assembled and then brought back to an ambient temperature.

In some embodiments, regardless of whether the bearing element 104 is materially joined to the bearing ring 102 or assembled with the bearing ring using a press fit or similar technique or configuration, the bearing element 104 may be additionally secured or retained by relative to the bearing ring 102 using, for example, a mechanical fastener or other technique or configuration such as described in various embodiments below.

As seen in FIG. 2, the carrier member 114 may include an opening 120 formed therein and configured to be coupled with a mechanical fastener 122. As used herein, the phrase "mechanical fastener" means an element that is used to mechanically join (or fasten) two or more objects together. Non-limiting examples of a mechanical fastener include: a bolt, screw, pin, rivet, retaining ring, stud, and metal stitching (e.g., metalock process). Accordingly, in one embodiment, opening 120 may be threaded to accept mechanical fastener 122, for example, if mechanical fastener 122 is also threaded. The mechanical fastener 122 may extend through an opening 124 (e.g., a counter-bored opening) formed in the bearing ring 102. The head of the fastener 122 may abut a surface (e.g., a shoulder of the opening 124) to fasten the bearing element 104 to the bearing ring 102. In some embodiments, instead of a carrier member 114 being attached to the substrate 112, a threaded opening may be formed directly in the substrate 112 and the mechanical fastener 122 may be directly coupled with the substrate 112 of the bearing element 104.

In addition to the bearing element 104 being attached to the bearing ring 102 by a mechanical fastener 122 or other mechanical member, the bearing element 104 may further be attached to the bearing ring 102 by an appropriate joining process such as, for example, welding or by brazing. In one embodiment, the bearing element 104 may be welded to the bearing ring 102 using a process such as TIG (tungsten inert gas) welding or laser welding. These welding techniques may be used to conduct localized and/or low temperature welding in order to join, for example, the substrate 112 to the bearing ring 102, the carrier member 114 to the bearing ring 102, both the substrate 112 and the carrier member 114 to the bearing ring 102, and/or the mechanical fastener 122 to the bearing ring 102, depending on the physical configuration of the bearing ring 102 and bearing element 104 (e.g., depending on the depth or configuration of the pocket in which a bearing element 104 is positioned).

Once assembled, surfaces of the tables 110 may be substantially coplanar to define a collective bearing surface configured to engage another bearing assembly (e.g., similar to bearing assembly 100 shown in FIG. 1) or some other bearing surface. The bearing assembly 100 may rotate about a central axis 130 relative to another bearing structure while carrying a specified load as will be appreciated by those of ordinary skill in the art. It is noted that, while a thrust bearing is shown in FIGS. 1-3, the use of mechanical fastening structures and/or material joining techniques may be used in conjunction with other bearing types including, for example, radial bearing assemblies (such as shown in described in many of documents that have been incorporated herein by reference) as well as tapered bearing assemblies and spherical bearing assemblies.

It is noted that when the bearing element 104 is assembled with the bearing ring 102 using a material joining technique (e.g., by brazing or welding), that the material joined region provides a thermal pathway to transfer heat from the bearing element 104 through the bearing ring 102 and to the operating environment. However, when the bearing element 104 is not assembled with the bearing ring 102 using a material joining technique, it may be desirable to thermally couple the bearing element 104 with the bearing ring 102 in some other way. For example, configurations such as described in U.S. Pat. No. 8,807,837 may be used to reduce thermal resistance between the bearing element 104 and the bearing ring 102. Additionally, in some embodiments (e.g., where the bearing element 104 is press fit into an associated pocket of the bearing ring 102), a thermal paste or a thermal grease may be disposed within the pocket to provide a heat transfer pathway between the bearing element 104 and the bearing ring 102. For example, a thermal paste known as XTM50 available from Corsair Components, Inc., of Fremont, Calif., may be disposed in pockets formed in the bearing ring 102 prior to assembling bearing elements 104 into the pockets. Another example includes a thermal grease known as TG-7 (CL-0004-GROSGM-A) available from Thermaltake, Inc., of City of Industry, Calif., which includes a silicon-based compound and diamond powder.

Improving the thermal capacity of the bearing assembly 100 provides a number of advantages. A bearing assembly 100 with higher thermal conduction between the bearing elements 104 and the bearing ring 102 enables the bearing assembly 100 to be operated at higher loadings. Additionally, the dispersion of heat from the bearing elements 104 helps the multiple bearing elements 104 to remain properly aligned, providing a desired collective bearing surface for engagement with another surface (e.g., a solid surface, bearing elements of another bearing assembly, etc.).

Still referring to FIGS. 1-3, in some embodiments, a threadlocking compound may be used in association with the mechanical fastener 122 to inhibit the mechanical fastener 122 from becoming loose or backing out of engagement with the carrier member 114 due to vibrations and shock. Such threadlocking compounds may desirable configured as high-strength and high-temperature compounds. Use of such compounds my also provide protection against corrosion, galling, or seizing to enable subsequent disassembly and repair of the bearing assembly 100. Various threadlocking compounds are available including, for example, those offered under the brand of Loctite®. Additionally, configuring the bearing assembly 100 such that the exposed surface 132 of the mechanical fastener 122 (e.g., the head of the mechanical fastener 122) is substantially flush with, or substantially planar with, the back surface 134 of the bearing ring 102 may also help to retain the mechanical fastener 122 in its designed engagement with the carrier member 114. Often, the back surface 134 of the bearing ring 102 is positioned immediately adjacent to or in abutting contact with another component. Thus, making the head of the mechanical fastener 122 flush with the back surface would capture the mechanical fastener 122 in its installed state making it physically impossible for the mechanical fastener 122 to disengage from the bearing element 104 when the bearing assembly 100 is installed and in operation.

Figure 4:
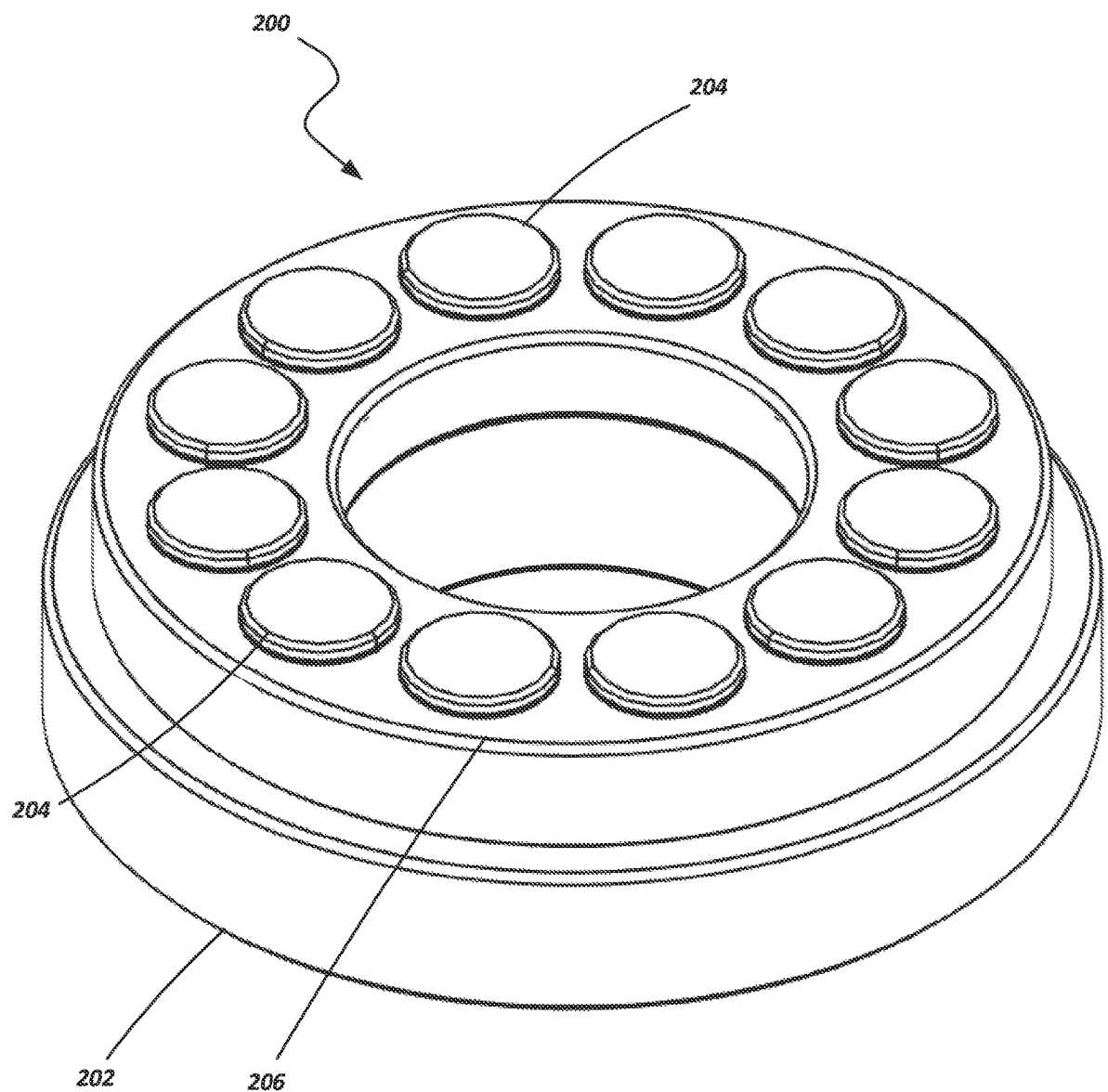
FIG. 4 shows a perspective view of a bearing assembly according to another embodiment of the present disclosure.
Figure 5:
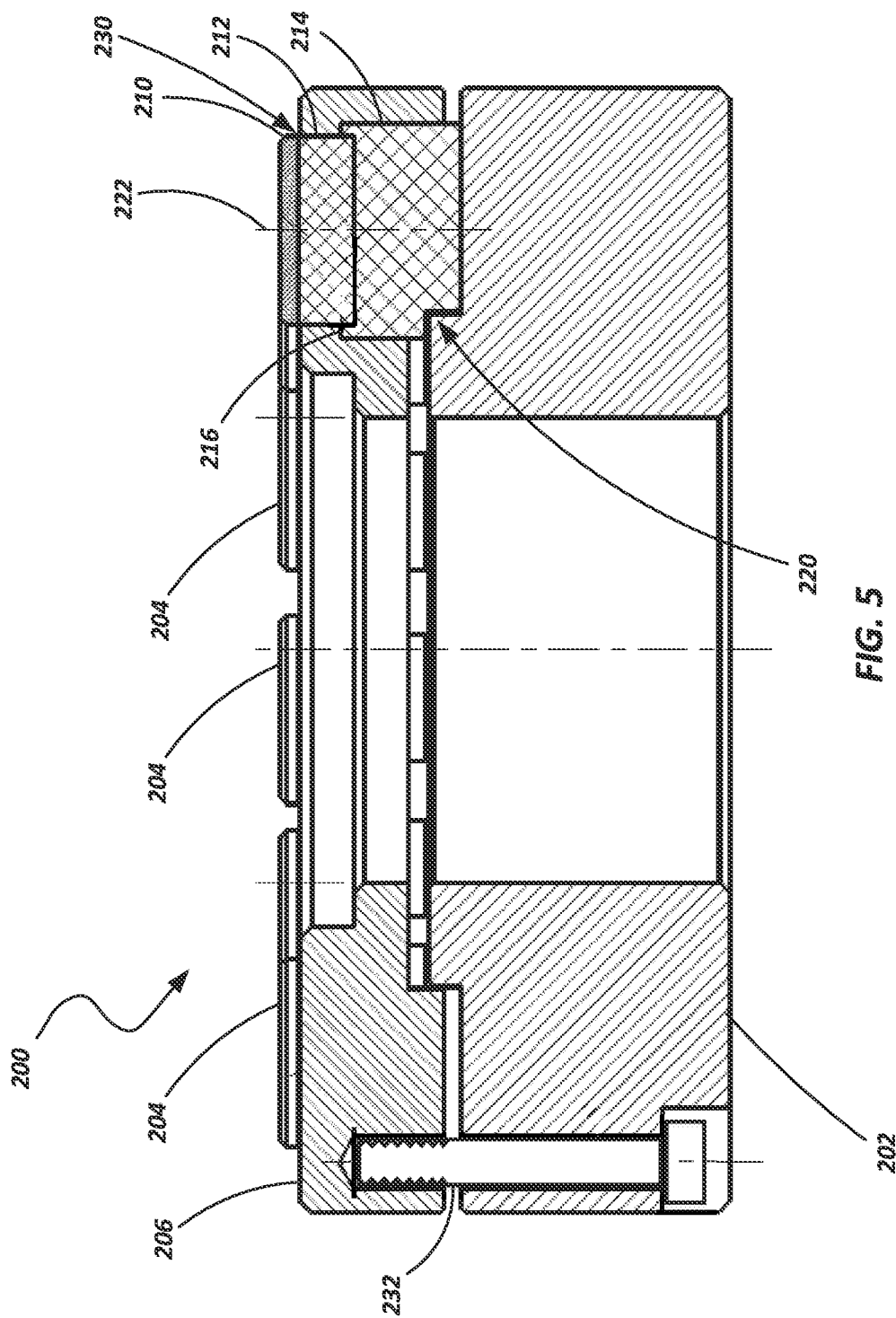
FIG. 5 shows a cross-sectional side view of the bearing assembly shown in FIG. 4.

Referring to FIGS. 4 and 5, another bearing assembly 200 is shown in accordance with an embodiment of the present disclosure. The bearing assembly 200 may include a base member 202, a plurality of bearing elements 204, and a retainer or a retaining member 206 configured to couple or fasten the bearing elements 204 to the base member 202.

The bearing elements 204 may each include a superhard table 210 coupled with a substrate 212 such as has been discussed above. The substrate 212 may further be coupled with a carrier member 214. The carrier member 214 may be formed from any of a number of suitable materials. For example, the carrier may comprise a metal (e.g., steel, stainless steel, Super Duplex stainless steel, titanium, Inconel®, Stellite™ or any suitable metal alloy), a carbide material, or other hard materials.

Figure 6:
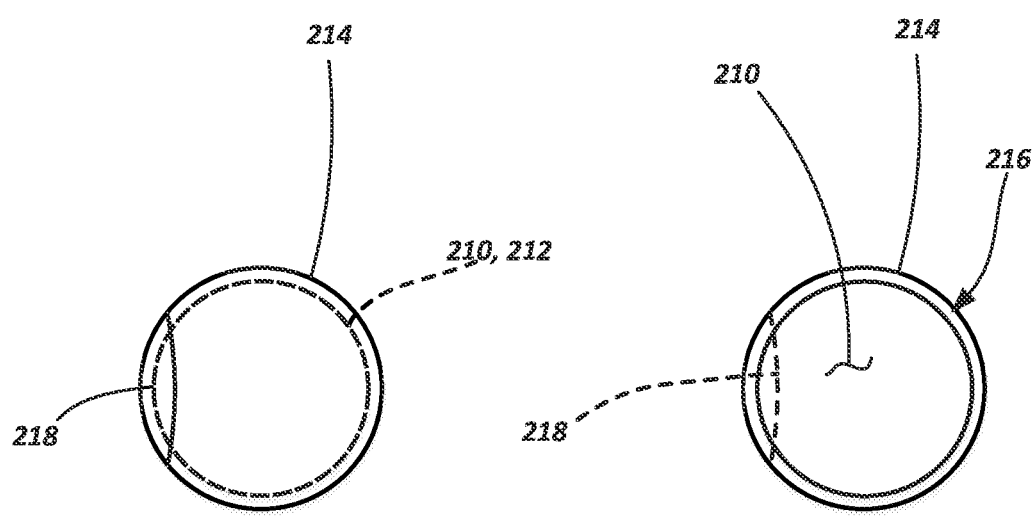
FIG. 6 shows a partial cross-sectional top view of the bearing assembly shown in FIG. 4.

In the embodiment shown in FIGS. 4 and 5, and as shown in FIGS. 6A and 6B, the carrier 214 may be configured to exhibit a larger periphery or circumference than the table 210 or substrate 212, providing an abutment shoulder 216. Additionally, a key or anti-rotation feature may be formed in a portion of the bearing element 204. For example, a small recess 218 may be formed in a portion of the carrier member 214 that is configured for engagement with a shoulder or wall 220 of the base member 202. It is noted that FIG. 6A shows a bottom view of the bearing element 204, with the substrate 210 and table 212 being indicated by dashed lines, while FIG. 6B shows a top view of a bearing element 204 with the recess 218 being indicated by dashed lines. In the embodiment shown in FIGS. 5, 6A and 6B, the recess 218 engages or abuts an interior annular wall 220 of the base member 202, preventing or limiting the bearing element 204 from rotation about its central axis 222 relative to the base member 204 when the all of the components are assembled.

The retaining member 206 includes several through holes or openings 230 configured such that at least a portion of the tables 210 (and optionally, a portion of the substrate 212) extend through while the abutment shoulders 216 of the of the bearing elements 204 engage the retaining member 206 such that the carrier members 214 are physically or geometrically captured between the retaining member 206 and the base member 202.

As seen in FIG. 5, mechanical fasteners 232 or other mechanical mechanisms may be used to couple the retaining member 206 with the base member 202. For example, mechanical fasteners 232 may extend through openings in the base member 202 and be threadedly coupled with the retaining member 206 (or vice versa), sandwiching and/or physically capturing the carrier members 214 therebetween. Multiple mechanical fasteners 230 may be used. For example, in one embodiment, three fasteners may be equally spaced about the bearing assembly 200. Of course, other quantities of fasteners may be used. Additionally, while the mechanical fasteners 232 are shown as extending through the base member 202 and into retaining member 206, other embodiments could be implemented as well (e.g., the mechanical fasteners 232 could extend through the retaining member 206 and into the base member 202) so long as the mechanical fasteners do not protrude above the bearing surfaces of the bearing elements or otherwise cause interference. Other examples that may include retaining members are described in U.S. Pat. No. 8,496,075, entitled BEARING ASSEMBLIES BEARING APPARATUSES USING THE SAME, AND RELATED METHODS, issued Jul. 30, 2013, the disclosure of which is incorporated by reference herein in its entirety.

In addition to the use of a retaining member 206 to clamp the bearing elements 204 to the base member 202, material joining techniques may be used as well. For example, brazing or welding techniques may be used to join the bearing elements with the base member 202, with the retaining member 206, or with both. In one example, the carrier member 214 of a bearing element 204 may be welded (e.g., TIG welded or laser welded) to the base member 202 or to the retaining member 206. In another example, the substrate 212 may be welded to the retaining member 206. Additionally, press fit or interference fit techniques may be used in conjunction with the use of a retaining member 206. For example, the bearing elements 204 may be press fit into the openings 230 of the retaining member 206. In other embodiments, the bearing elements may be press fit into a pocket (not shown) formed in the bearing ring 202. As with previously described embodiments, particularly when material joining techniques are not used, a thermal paste, thermal grease or other thermally conductive structure may be employed to improve thermal conductance between the bearing element 204, the bearing ring 202, and/or the retaining ring 206. Further, as also discussed above, thread-locking compounds may be used in association with the fasteners 232 and, while not shown, the assembly 200 may be configured such that the head of the fastener 232 may be substantially flush with a back or bottom surface of the bearing ring 202.

Figure 7:
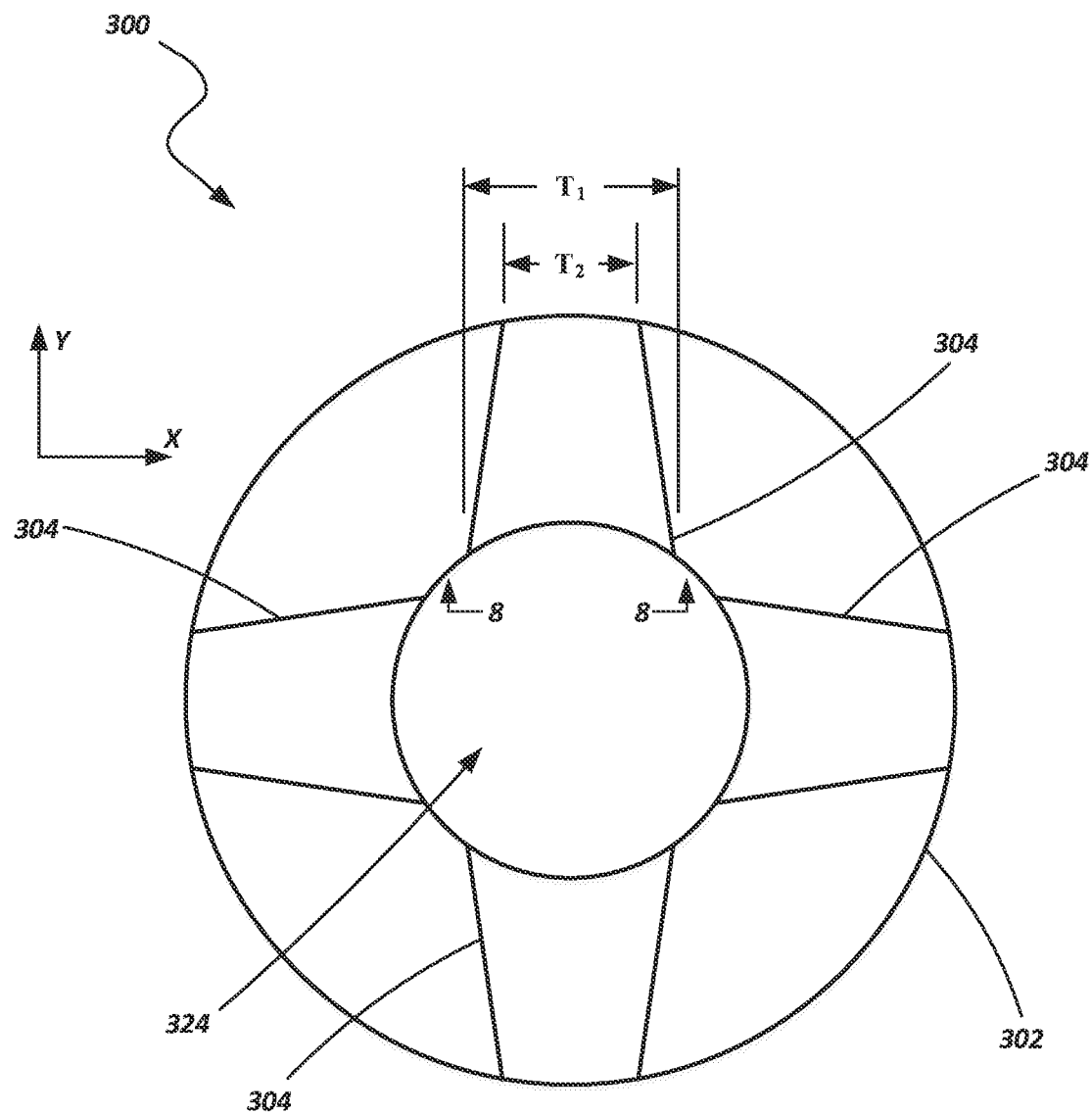
FIG. 7 shows a top view of a bearing assembly according to another embodiment of the present disclosure.
Figure 8:
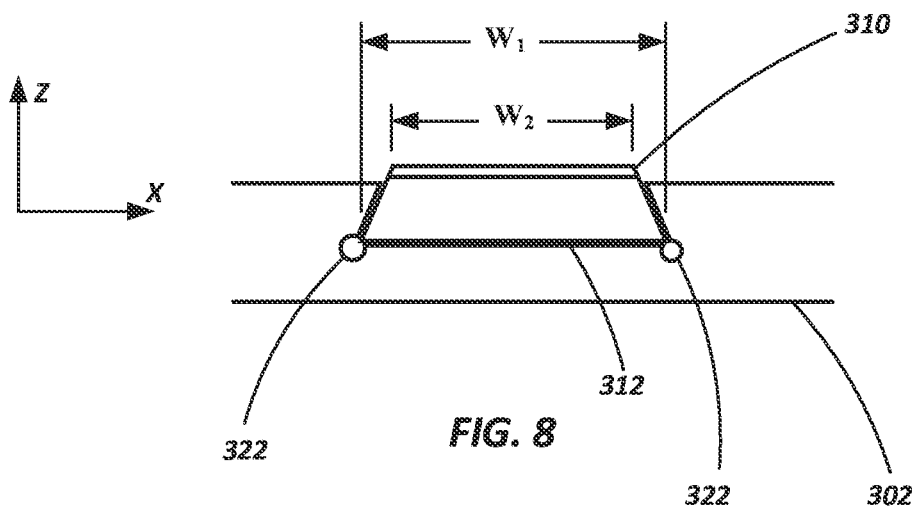
FIG. 8 is a partial cross-sectional view of the assembly shown in FIG. 7 according to an embodiment of the present disclosure.
Figure 9:
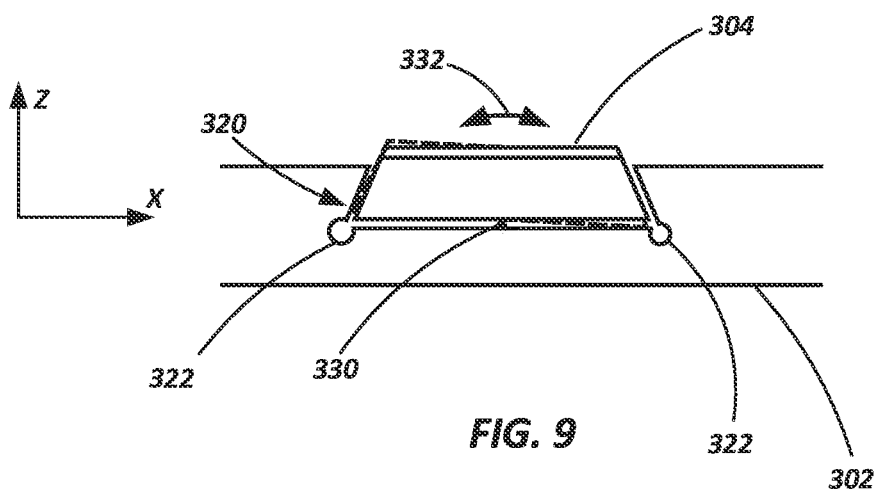
FIG. 9 is a variation of the embodiment shown in FIG. 8.

Referring now to FIGS. 7-9, a bearing assembly 300 is shown in accordance with another embodiment of the present disclosure. The bearing assembly 300 includes a body or base member 302 and a plurality of bearing elements 304. The bearing elements 304 may be formed in accordance with processes and techniques previously described herein having, for example, a superhard table 310 bonded with a substrate 312. While previous embodiments illustrated bearing elements that were generally cylindrical (though such embodiments are not limited to particular shapes or geometries of bearing elements), the embodiment shown in FIGS. 7-9 exhibit geometries that vary in multiple dimensions. For example, the thickness, as measured with reference to the X axis, of the topmost bearing element shown in FIG. 7 varies as a function of position with respect to the Y axis. More specifically, the "thickness" of the topmost bearing element is reduced from a first thickness $T_1$ to a second thickness $T_2$ along the Y direction, as it extends from a first, inner radial position to a second, outer radial position. Thus, stated in another way, the bearing elements 304 size and/or shape may vary as a function of radial position.

Additionally, the bearing elements 304 vary in size and/or shape as a function of position with respect to the Z axis, or with respect to an axial direction of each bearing element, as seen in FIG. 8. Thus, in one embodiment, as each of the bearing elements 304 extend upward from the base member 302, its width is reduced from a first width $W_1$ to a second, smaller width $W_2$.

The bearing elements 304 may, thus, be considered to be configured as having a generally wedged shape in the radial direction as well as a generally wedged shape in the axial direction. Correspondingly shaped recesses or pockets 320 are formed in the base member 302, enabling the bearing elements 304 to be slid into the recesses from a radial inner circumference of the base member 302. The pockets 320 may include relief recesses 322 at various locations, such as in the corners of the pockets 320. The relief recesses 322 may help to facilitate easier assembly of the bearing elements 304 into the pockets 320 as well as provide stress relief in areas of sharp transition and during times of high loading of the bearing elements 302.

Once positioned within the pockets 320, the bearing elements are axially captured our coupled to the base member 302 by reason of their geometries. Additionally, as shown in FIG. 8, the bearing members 304 are limited from further movement in a radial outward direction. A shaft, a ring or other member (not shown) may be positioned in the internal aperture 324 of the base member 302 to limit or prohibit movement in a radial inward direction. Thus, the bearing elements 304 are mechanically coupled to the base member 302.

In one embodiment, the bearing members 304 may additionally be otherwise joined with the base member 302. For example, considering FIG. 8, the bearing element 304 may be brazed or welded to the base member 302. In one embodiment, for example, the substrate 312 may be welded to the base member 302 by way of TIG welding or laser welding.

Referring briefly to FIG. 9, in an alternate embodiment, a bump, ridge or other protrusion 330 may be positioned with the pocket 320 and abut a portion of the substrate 312. Additionally, the pocket 320 may be sized slightly larger than the bearing element 304 to provide a limited amount of movement or play in the bearing element 304 relative to the base member 302. Such a configuration may enable the bearing element 304 to rock or tilt about the protrusion 330 as indicated by directional arrow 332. The bearing assembly 300 may be, in some embodiments, configured as a tilting pad bearing assembly. In such an embodiment, the bearing element 304 would not be brazed or welded to the base member 302.

Figure 10:
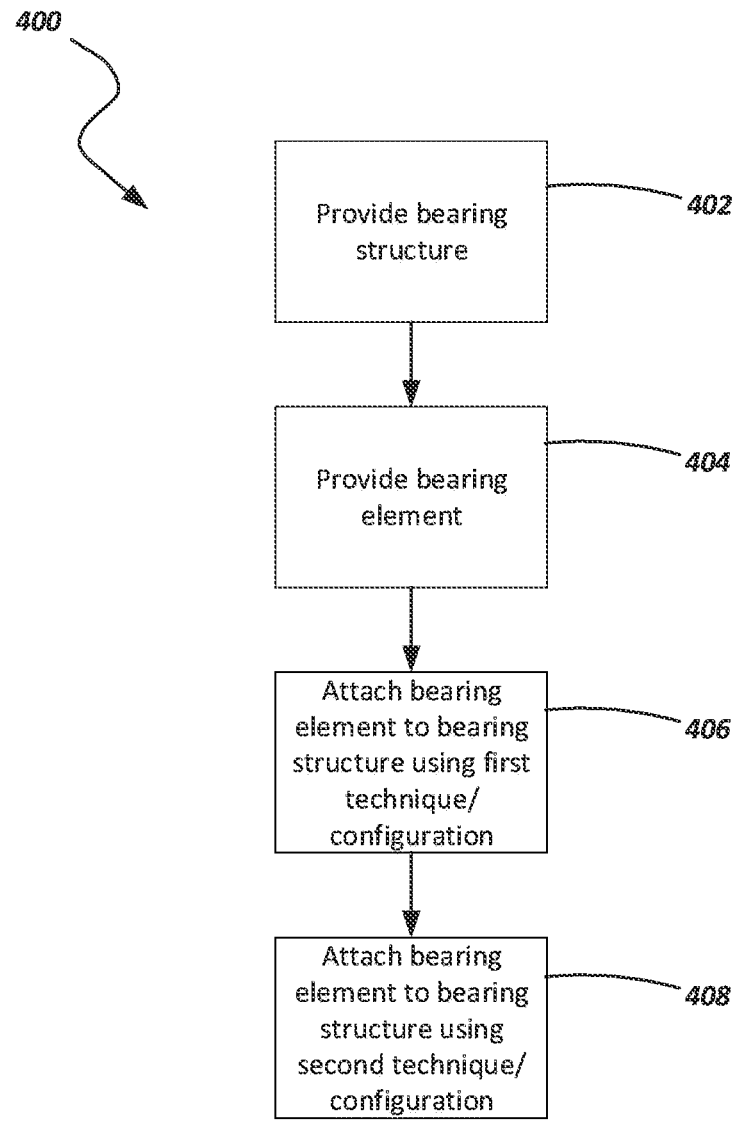
FIG. 10 is a flow diagram showing a method of making a bearing assembly according to an embodiment of the present disclosure.

Referring to FIG. 10, a process diagram is shown which depicts a method or process of fabricating a bearing in accordance with an embodiment of the present disclosure. The process 400 includes providing a bearing structure, such as indicated at 402. The act of providing a bearing structure may include providing a bearing ring, base member, including with the embodiments previously described herein. The structure may be formed of a variety of materials including those previously described. The process 400 further includes providing a bearing element as indicated at 404. The bearing element may include any suitable bearing element including those that have been previously described herein. The bearing element is attached to the bearing structure using a first attachment technique/configuration as indicated at 406. The first attachment technique/configuration may include a mechanical fastening technique, a clamping assembly, a "geometrical fit" (e.g., an interference fit, a snap fit, a press fit, or a geometric "capture" technique such as described with respect to FIGS. 7-9), a material joining technique such as brazing or welding, or other appropriate means. The bearing element may be attached to the bearing structure using a second attachment technique/configuration as indicated at 408. The second attachment technique/configuration may include any of the techniques/configurations previously mentioned, but is different than the first attachment technique/configuration used during the act indicated at 406. Thus, for example, if the first attachment technique/configuration is a mechanical fastening technique/configuration, the second attachment technique/configuration may include a material joining technique or a different mechanical fastening technique/configuration. In another example, if the first attachment technique/configuration is a geometrical fit, the second attachment technique/configuration may include a material joining technique, a different geometrical fit, or a mechanical fastening technique/configuration. The acts of the process 400 need not be practiced in a specific order, and one technique of/configuration fastening need not be practiced for the first attachment technique/configuration in order to use any particular technique for the second attachment technique/configuration.

Figure 11:
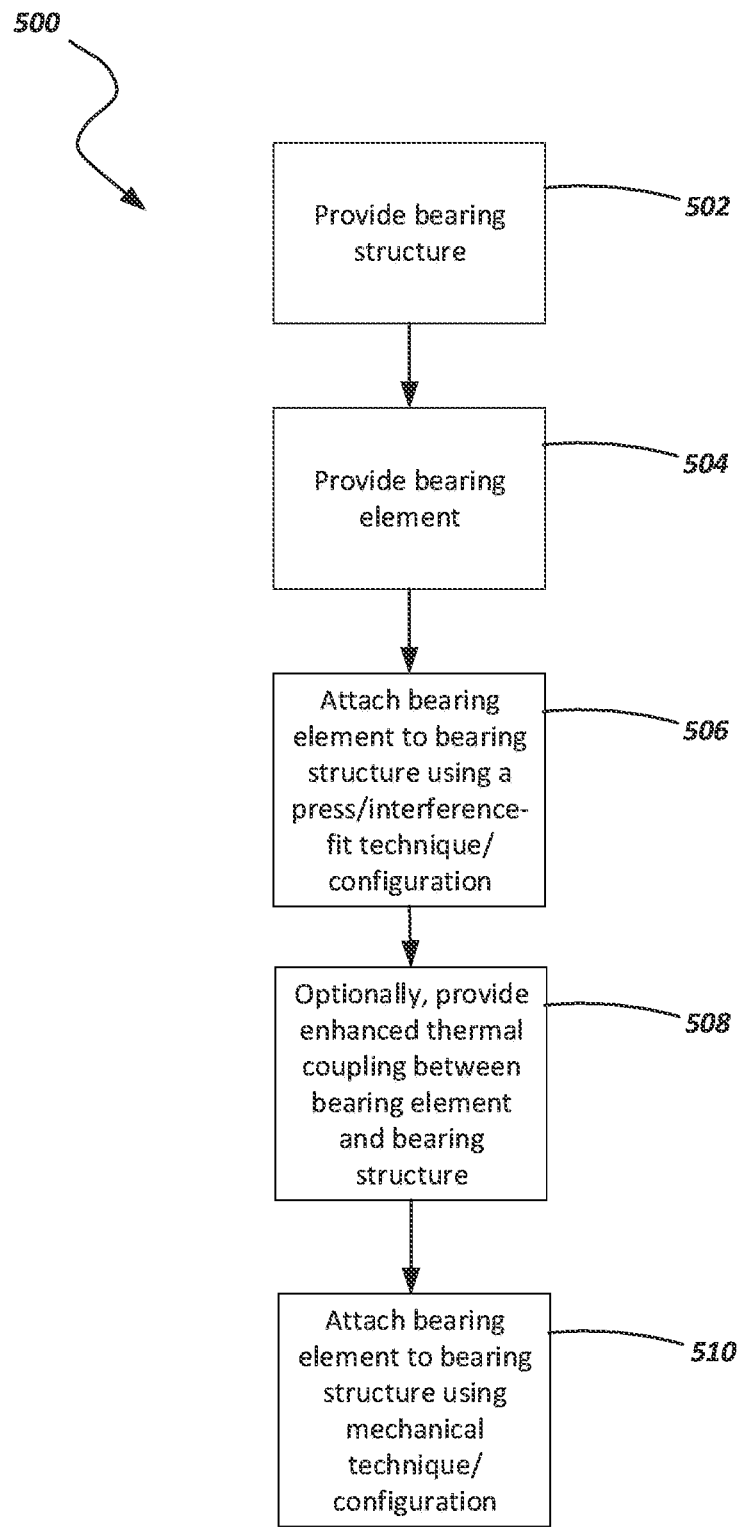
FIG. 11 is a process diagram that depicts a method or process of fabricating a bearing in accordance with an embodiment of the present disclosure.

Referring now to FIG. 11, a process diagram is shown which depicts another method or process of fabricating a bearing in accordance with an embodiment of the present disclosure. The process 500 includes providing a bearing structure, such as indicated at 502. The act of providing a bearing structure may include providing a bearing ring, base member, including with the embodiments previously described herein. The structure may be formed of a variety of materials including those previously described. The process 400 further includes providing a bearing element as indicated at 504. The bearing element may include any suitable bearing element including those that have been previously described herein.

The bearing element is attached to the bearing structure by way of press fit or interference fit, as indicated at 506. As previously discussed, this act may include providing a bearing element that is slightly larger than an associated recess or pocket into which the bearing element will be disposed. This may further include cooling the bearing element, heating the bearing structure, or doing both, and then attaching the bearing element to the bearing structure (e.g., placing the bearing element in the pocket). The bearing element and bearing structure may be brought to an equilibrium temperature such that there is a geometrical interference between the bearing element and the bearing structure.

Optionally, the process 500 may include providing an enhanced thermal coupling between the bearing element and the bearing structure as indicated at 508. This act may include providing a thermal coupling structure or disposing a thermally conductive paste or grease between the bearing element and the bearing structure. The act 508 of providing an enhanced thermal coupling between the bearing element and the bearing structure may take place prior to, substantially simultaneously with, or after the act 506 of attaching the bearing element with the bearing structure.

The process 500 may further include mechanically attaching the bearing element with the bearing structure are indicated at 510. The act 510 of mechanically attaching the bearing element with the bearing structure may include using a mechanical fastener or using clamping assembly to couple the bearing element to the bearing structure.

In embodiments where the bearing element is attached to a bearing ring or other bearing structure without using material joining techniques (e.g., brazing or welding), or in cases where low temperature material joining techniques are used (e.g., at temperatures below 700° C. or below), help to maintain alignment of the bearing elements through manufacturing and keep the various materials (e.g., a stainless steel bearing ring, diamond in the bearing elements) from experiencing a high temperature thermal cycle which can have deleterious effects on their material properties and performance.

Further, such embodiments may reduce the number of manufacturing acts required to produce a final bearing. For example, in prior art bearing assemblies where bearing elements are brazed using a conventional brazing process, manufacturing a bearing assembly may include the following acts: 1) rough lathe, 2) rough mill, 3) brazing the bearing elements to the bearing structure, 4) diamond shaping (such as by lapping or grinding), 5) finish lathe, and 6) finish mill. When using techniques and embodiments of the present disclosure, the manufacturing of the bearing assembly can be simplified to include the following acts: 1) lathe, 2) mill, 3) attach (such as by mechanical attachment or any of the configurations described herein), and 4) shaping. In some cases, there may still be a final touch up (e.g., via a mill process) to provide all of the bearing elements with a common height, but such is minor. IN either case, the manufacturing process is simplified and significant time is saved in using embodiments of the present disclosure.

The use of multiple attachment concepts/structures, such as a mechanical fastening technique/configuration combined with a material joining technique/configuration, or a press fit technique/configuration combined with a mechanical fastening technique/configuration, may also provide greater reliability to the bearing assembly. Additionally, using such techniques enables the ability to refurbish a bearing assembly more easily through removal and replacement of individual bearing elements. Further, using such techniques/configurations enables the use of lower temperature welding techniques, resulting in the ability to use a variety of different materials such as has been described hereinabove. The use of materials beyond typical mild steel or stainless steel components may enable the bearing assemblies to be utilized in expanded applications and new environments.

While certain embodiments and details have been included herein for purposes of illustrating aspects of the instant disclosure, it will be apparent to those skilled in the art that various changes in the systems, apparatuses, and methods disclosed herein may be made without departing from the scope of the instant disclosure, which is defined, in part, in the appended claims. The words "including" and "having," as used herein including the claims, shall have the same meaning as the word "comprising." Additionally, it should be noted that aspects, features or elements of a given embodiment may be combined with aspects, features or elements of other embodiments without limitation.

What is claimed is:

1. A bearing assembly comprising:
   a base member;
   at least one bearing element coupled to the base member by a clamped structure and at least one of welding or brazing; and
   a retainer having at least one opening formed therein, wherein:
      the at least one bearing element includes a carrier element attached to a substrate,
      the carrier element being sized and configured to provide an abutment shoulder;
         at least one mechanical fastener couples the retainer with the base member such that the at least one bearing element is captured between the base member and the retainer with the abutment shoulder of the carrier element abutting a surface of the retainer; and
      wherein the at least one bearing element includes a superhard table bonded to the substrate and the carrier element attached to the substrate;
      at least a portion of the superhard table extends through the at least one opening of the retainer; and
      wherein the base member includes a wall, and the at least one bearing element includes a key that engages the wall to inhibit rotation of the at least one bearing element relative to the base member.

2. The bearing assembly of claim 1, wherein the at least one mechanical fastener comprises at least one bolt.

3. The bearing assembly of claim 2, wherein:
   the base member includes at least one opening formed therein; and
   the at least one mechanical fastener extends through the at least one opening in the base member and is threadedly coupled with the retainer.

4. The bearing assembly of claim 2, wherein at least a portion of the carrier element of the at least one bearing element is at least partially disposed in the at least one opening of the retainer.

5. The bearing assembly of claim 1, wherein the wall is substantially cylindrical and the key is formed as a recess in the carrier element and provides an arcuate surface to engage the wall.

6. The bearing assembly of claim 1, wherein the carrier element of the at least one bearing element is geometrically captured between the retainer and the base member.

7. The bearing assembly of claim 6, wherein the superhard table and the substrate of the at least one bearing element exhibit a substantially cylindrical shape.

8. The bearing assembly of claim 7, wherein:
   the base member is substantially cylindrical.

9. A method of fabricating a bearing assembly, the method comprising:
   providing a bearing structure including a wall;
   providing at least one bearing element that includes a carrier element attached to a substrate, the carrier element being sized and configured to provide an abutment shoulder, and a key;
   positioning the bearing structure so that the key engages the wall to inhibit rotation of the at least one bearing element relative to the bearing structure;
   coupling the at least one bearing element to the bearing structure using a clamped structure; and
   coupling the at least one bearing element to the bearing structure using at least one of welding or brazing.

10. The method according to claim 9, wherein providing at least one bearing element includes providing the at least one bearing element having a superhard table bonded to the substrate.

11. The method according to claim 10, further comprising coupling the clamped structure to the bearing structure with a mechanical fastener.

12. The method according to claim 11, further comprising extending the mechanical fastener through at least one opening of the bearing structure and threadedly coupling the mechanical fastener with the clamped structure.

13. The method according to claim 10, wherein positioning the bearing structure so that the key engages the wall to inhibit rotation of the at least one bearing element relative to the bearing structure comprises engaging the wall with an arcuate surface in the carrier element of the at least one bearing element to inhibit rotation between the at least one bearing element and the bearing structure.

14. The method according to claim 13, wherein the coupling the at least one bearing element comprises brazing the at least one bearing element to the bearing structure.

15. The method according to claim 9, wherein the coupling the at least one bearing element further includes capturing a shoulder of a carrier element coupled to the at least one bearing element between the bearing structure and a retainer.

16. The method according to claim 15, further comprising coupling the retainer to the bearing structure with a mechanical fastener.

17. A bearing assembly comprising:
a base member including a wall; and
at least one bearing element comprising a superhard table bonded to a substrate, the at least one bearing element being coupled to the base member using a clamped structure and at least one of welding or brazing, and the at least one bearing element includes a key that engages the wall to inhibit rotation of the at least one bearing element relative to the base member.

* * * * *